United States Patent
Kim

(10) Patent No.: US 11,101,897 B1
(45) Date of Patent: Aug. 24, 2021

(54) OPTICAL RECEIVER WITH SEPARATED MAGNITUDE MODULATION AND PHASE MODULATION AND OPERATION METHOD THEREOF

(71) Applicant: Electronics and Telecommunications Research Institute, Daejeon (KR)

(72) Inventor: Jong-Hoi Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/185,484

(22) Filed: Feb. 25, 2021

(30) Foreign Application Priority Data

Feb. 26, 2020 (KR) .................. 10-2020-0023568

(51) Int. Cl.
  *H04B 10/00* (2013.01)
  *H04B 10/69* (2013.01)
  *H04B 10/67* (2013.01)
  *H04J 14/00* (2006.01)

(52) U.S. Cl.
  CPC ........ *H04B 10/6931* (2013.01); *H04B 10/673* (2013.01); *H04B 10/691* (2013.01)

(58) Field of Classification Search
  CPC ...... H04B 10/60; H04B 10/61; H04B 10/612; H04B 10/613; H04B 10/614; H04B 10/63; H04B 10/64
  See application file for complete search history.

(56) References Cited

U.S. PATENT DOCUMENTS

| | | | |
|---|---|---|---|
| 7,110,168 B2 | 9/2006 | Lee et al. | |
| 2002/0145787 A1 | 10/2002 | Shpantzer et al. | |
| 2005/0088724 A1 | 4/2005 | Lee et al. | |
| 2009/0074428 A1* | 3/2009 | Liu | H04B 10/677 398/208 |
| 2009/0226187 A1* | 9/2009 | Tanimura | H04B 10/677 398/202 |

(Continued)

OTHER PUBLICATIONS

Peng Zhou et al., "Reflective semiconductor optical amplifier with segmented electrodes for high-speed self-seeded colorless transmitter", Optics Express, Nov. 13, 2017, pp. 28547-28555, vol. 25, No. 23.

(Continued)

*Primary Examiner* — Daniel G Dobson
(74) *Attorney, Agent, or Firm* — Kile Park Reed & Houtteman PLLC

(57) ABSTRACT

Disclosed is an optical receiver. The optical receiver includes an optical splitter that splits an external light signal to output a first light signal and a second light signal, a first amplifier that amplifies the first light signal in a linear gain section to output an amplified first light signal, a second amplifier that amplifies the second light signal in a saturation gain section to output an amplified second light signal, a polarization division hybrid that outputs an in-phase hybrid light signal and a quadrature-phase hybrid light signal, based on a reference light signal and the amplified second light signal, and an optoelectronic conversion unit that outputs an electrical signal, based on the amplified first light signal, the in-phase hybrid light signal, and the quadrature-phase hybrid light signal.

18 Claims, 9 Drawing Sheets

(56) References Cited

U.S. PATENT DOCUMENTS

2011/0064422 A1   3/2011   Kim et al.
2013/0156424 A1   6/2013   Youn et al.

OTHER PUBLICATIONS

Young-Tak Han et al., "A Compact 100G-ER4 ROSA Realized by Hybrid Integration of SOA and Lensed PIN-PDs for QSFP28 Transceivers", OFC, 2019.

* cited by examiner

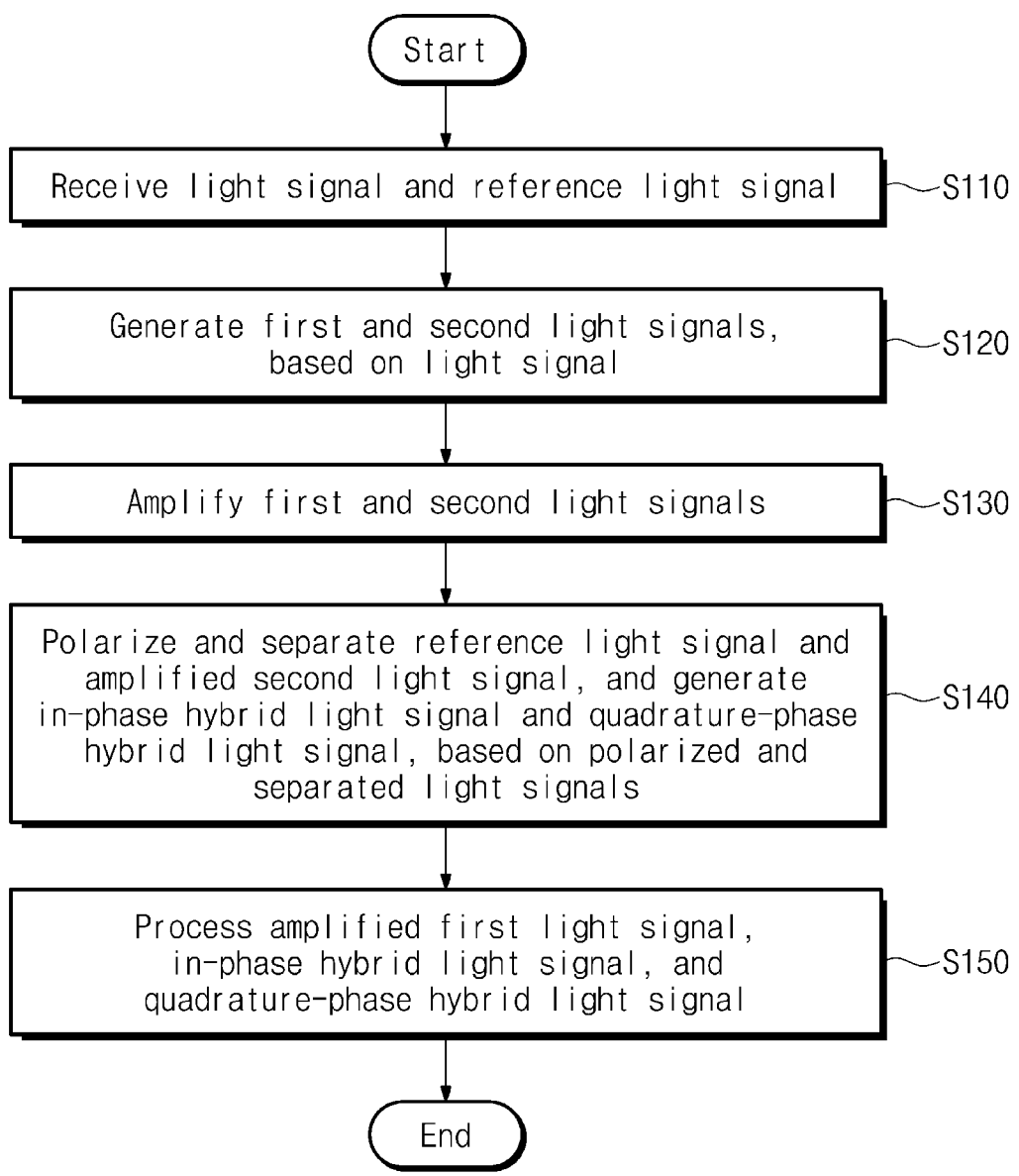

OPTICAL RECEIVER WITH SEPARATED MAGNITUDE MODULATION AND PHASE MODULATION AND OPERATION METHOD THEREOF

CROSS-REFERENCE TO RELATED APPLICATIONS

This application claims priority under 35 U.S.C. § 119 to Korean Patent Application No. 10-2020-0023568 filed on Feb. 26, 2020, in the Korean Intellectual Property Office, the disclosures of which are incorporated by reference herein in their entireties.

BACKGROUND

Embodiments of the present disclosure described herein relate to an optical receiver and an operation method thereof, and more particularly, relate to an optical receiver in which a magnitude modulation and a phase modulation are separated in a quadrature amplitude modulation (QAM), and an operation method thereof.

Optical communication refers to a communication method in which information is exchanged using total reflection of light through an optical fiber. To increase the data transmission capacity in the optical communication, a higher-order modulation method is used in which two or more bits are transmitted in one symbol when a light signal is generated. Among the higher-order modulation methods, there is a quadrature amplitude modulation (QAM) type modulation in which a capacity of data is increased by adding a magnitude modulation to a quadrature phase shift keying (QPSK) type modulation.

Recently, as mobile communication technologies are developed and demand for large-capacity services such as high-quality video streaming is increased, data transmission capacity in optical communication is increasing. Accordingly, in an optical communication device, improvement in communication quality and signal processing speed, and enhancing of power consumption are required.

SUMMARY

Embodiments of the present disclosure provide an optical receiver in which a magnitude modulation and a phase modulation are separated, and an operation method thereof.

According to an embodiment of the present disclosure, an optical receiver includes an optical splitter that splits an external light signal to output a first light signal and a second light signal, a first amplifier that amplifies the first light signal in a linear gain section to output an amplified first light signal, a second amplifier that amplifies the second light signal in a saturation gain section to output an amplified second light signal, a polarization division hybrid that outputs an in-phase hybrid light signal and a quadrature-phase hybrid light signal, based on a reference light signal and the amplified second light signal, and an optoelectronic conversion unit that outputs an electrical signal, based on the amplified first light signal, the in-phase hybrid light signal, and the quadrature-phase hybrid light signal.

According to an embodiment, a luminous intensity of the second light signal may be greater than that of the first light signal.

According to an embodiment, the optical splitter may include an optical attenuator that attenuates a luminous intensity of the external light signal, and an asymmetric optical splitter that receives the attenuated external light signal from the optical attenuator, asymmetrically splits the attenuated external light signal into the first light signal and the second light signal, and outputs the first light signal and the second light signal to the first amplifier and the second amplifier, respectively.

According to an embodiment, the optical splitter may include an optical splitting unit that splits the external light signal into a first split light signal and a second split light signal that have the same luminous intensity, a first optical attenuator that outputs the first light signal obtained by attenuating the first split light signal by a first attenuation coefficient to the first amplifier, and a second optical attenuator that outputs the second light signal obtained by attenuating the second split light signal by a second attenuation coefficient less than the first attenuation coefficient to the second amplifier.

According to an embodiment, the first amplifier may be further configured to increase a difference in luminous intensity of the first light signal received from the optical splitter.

According to an embodiment, the second amplifier may be further configured to decrease a difference in luminous intensity of the second light signal received from the optical splitter.

According to an embodiment, a difference in luminous intensity of the amplified first light signal may be greater than that of the amplified second light signal.

According to an embodiment, each of the first and second amplifiers may be a gain clamped semiconductor optical amplifier.

According to an embodiment, the second amplifier may include an offset circuit that offsets an effect of an external disturbance on an amplification of the second light signal.

According to an embodiment, the optoelectronic conversion unit may be further configured to convert the amplified first light signal to output a first electrical signal for demodulating a magnitude component of the external light signal, and to convert the in-phase hybrid light signal and the quadrature-phase hybrid light signal to output at least one of a second electrical signal for demodulating a phase component of the external light signal, and the electrical signal may include the first electrical signal and the at least one of the second electrical signal.

According to an embodiment of the present disclosure, an optical receiver includes an optical splitter that splits an external light signal to output a first light signal and a second light signal having a greater luminous intensity than that of the first light signal, a first amplifier that outputs an amplified first light signal, based on the first light signal, a second amplifier that outputs an amplified second light signal, based on the second light signal, a polarization division hybrid that outputs an in-phase hybrid light signal and a quadrature-phase hybrid light signal, based on a reference light signal and the amplified second light signal, and an optoelectronic conversion unit that outputs an electrical signal, based on the amplified first light signal, the in-phase hybrid light signal, and the quadrature-phase hybrid light signal.

According to an embodiment, the first amplifier and the second amplifier may have a linear gain section corresponding to a luminous intensity range of the first light signal and a saturation gain section corresponding to a luminous intensity range of the second light signal, respectively.

According to an embodiment, the optical splitter may include an optical attenuator that attenuates a luminous intensity of the external light signal, and an asymmetric optical splitter that receives the attenuated external light signal from the optical attenuator, asymmetrically splits the attenuated external light signal into the first light signal and the second light signal, and outputs the first light signal and the second light signal to the first amplifier and the second amplifier, respectively.

According to an embodiment, the optical splitter may include an optical splitting unit that splits the external light signal into a first split light signal and a second split light signal that have the same luminous intensity, a first optical attenuator that outputs the first light signal obtained by attenuating the first split light signal by a first attenuation coefficient to the first amplifier, and a second optical attenuator that outputs the second light signal obtained by attenuating the second split light signal by a second attenuation coefficient less than the first attenuation coefficient to the second amplifier.

According to an embodiment of the present disclosure, a method of operating an optical receiver includes receiving an external light signal and a reference light signal, generating a first light signal and a second light signal, based on the external light signal, amplifying the first light signal in a linear gain section and amplifying the second light signal in a saturation gain section, generating an in-phase hybrid light signal and a quadrature-phase hybrid light signal, based on the reference light signal and the amplified second light signal, and processing the amplified first light signal, the in-phase hybrid light signal, and the quadrature-phase hybrid light signal.

According to an embodiment, the generating of the first light signal and the second light signal may include attenuating a luminous intensity of the external light signal, and asymmetrically splitting the attenuated external light signal into the first light signal and the second light signal having a greater luminous intensity than that of the first light signal.

According to an embodiment, the generating of the first light signal and the second light signal may include splitting the external light signal into a first split light signal and a second split light signal that have the same luminous intensity, generating the first light signal obtained by attenuating the first split light signal by a first attenuation coefficient, and generating the second light signal obtained by attenuating the second split light signal by a second attenuation coefficient less than the first attenuation coefficient.

According to an embodiment, the amplifying of the first light signal in the linear gain section and the amplifying of the second light signal in the saturation gain section may include amplifying the first light signal to increase a difference in luminous intensity of the first light signal, and amplifying the second light signal to decrease a difference in luminous intensity of the second light signal.

BRIEF DESCRIPTION OF THE FIGURES

The above and other objects and features of the present disclosure will become apparent by describing in detail embodiments thereof with reference to the accompanying drawings.

FIG. 9 is a flowchart describing an operation method of an optical receiver according to an embodiment of the present disclosure.

DETAILED DESCRIPTION

Figure 1:
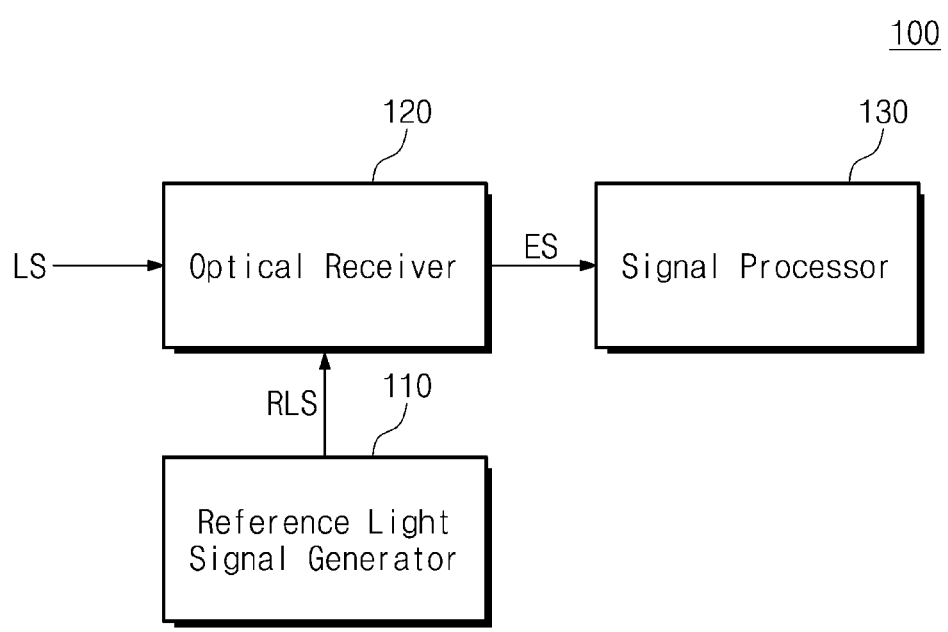
FIG. 1 is a diagram illustrating an optical receiving device according to an embodiment of the present disclosure.

Hereinafter, embodiments of the present disclosure will be described clearly and in detail such that those skilled in the art may easily carry out the present disclosure.

Terms such as "unit" and "module" used below, or functional blocks illustrated in the drawings may be implemented in the form of a software configuration, a hardware configuration, or a combination thereof. Hereinafter, to clearly describe the technical idea of the present disclosure, detailed descriptions of redundant components will be omitted.

FIG. 1 is a diagram illustrating an optical receiving device according to an embodiment of the present disclosure. Referring to FIG. 1, an optical receiving device 100 is illustrated as an example. The optical receiving device 100 may be a device that processes a light signal LS used in optical communication. The light signal LS may be a modulated signal including a series of data. The optical receiving device 100 may include a reference light signal generator 110, an optical receiver 120, and a signal processor 130. The reference light signal generator 110 may generate a reference light signal RLS used for a phase modulation.

The optical receiver 120 may receive the light signal LS from the outside. For example, the optical receiver 120 may receive the light signal LS from a separate optical transmission module (not illustrated). The optical receiver 120 may receive the reference light signal RLS from the reference light signal generator 110. The optical receiver 120 may generate an electrical signal ES, based on the light signal LS and the reference light signal RLS. The electrical signal ES may include data of the light signal LS. The specific operation of the optical receiver 120 will be described later with reference to FIG. 2.

The signal processor 130 may receive the electrical signal ES from the optical receiver 120. The signal processor 130 may process the electrical signal ES. For example, the signal processor 130 may restore data included in the light signal LS by demodulating the electrical signal ES.

In an embodiment, the light signal LS may be a modulated signal, based on a quadrature amplitude modulation (QAM). The quadrature amplitude modulation method is one of higher-order modulation methods, and may be a method in which a magnitude modulation is added to a quadrature phase shift keying (QPSK) method that a phase modulation uses an in-phase and a quadrature-phase.

In this case, the electrical signal ES may include a signal corresponding to a magnitude component of the light signal LS and a signal corresponding to a phase component of the light signal LS. The signal processor 130 may demodulate the magnitude component of the light signal LS. The signal processor 130 may demodulate the phase component of the light signal LS. The signal processor 130 may restore data included in the light signal LS, based on the demodulated magnitude component and the demodulated phase component.

Figure 2:
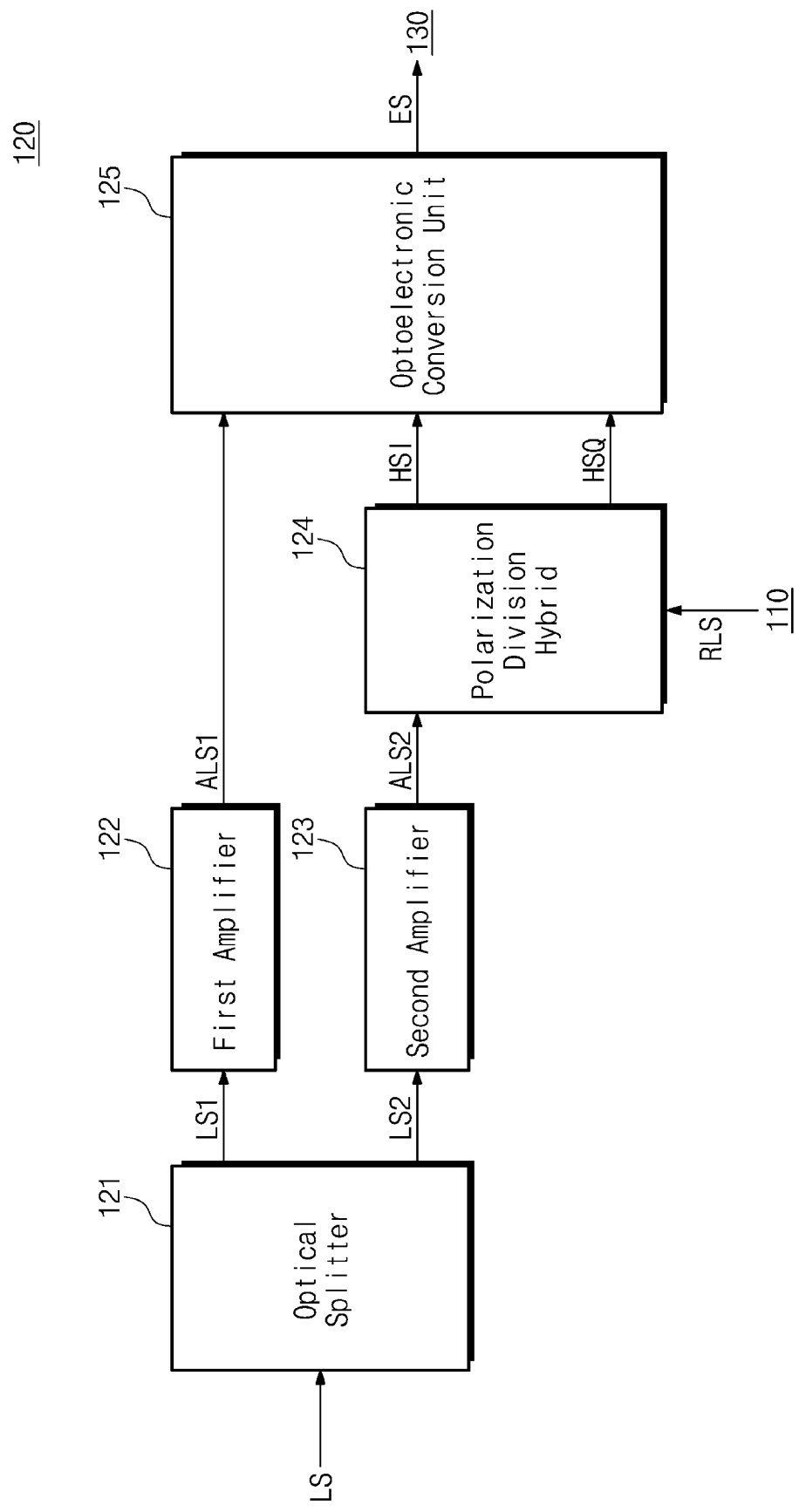
FIG. 2 is a detailed diagram illustrating an optical receiver of FIG. 1.

FIG. 2 is a detailed diagram illustrating an optical receiver of FIG. 1. Referring to FIG. 2, the optical receiver 120 is illustrated as an example. The optical receiver 120 may include an optical splitter 121, a first amplifier 122, a second amplifier 123, a polarization division hybrid 124, and an optoelectronic conversion unit 125.

The optical splitter 121 may receive the light signal LS. The optical splitter 121 may generate a first light signal LS1 and a second light signal LS2, based on the light signal LS. The optical splitter 121 may output the first light signal LS1 and the second light signal LS2 to the first amplifier 122 and the second amplifier 123, respectively. In this case, a sum of a luminous intensity of the first and second light signals LS1 and LS2 may be less than that of the light signal LS. The luminous intensity of the first light signal LS1 may be different from the luminous intensity of the second light signal LS2. In detail, the optical splitter 121 may be a module that attenuates and asymmetrically splits the light signal LS.

In an embodiment, the luminous intensity of the second light signal LS2 may be greater than the luminous intensity of the first light signal LS1.

The first amplifier 122 may receive the first light signal LS1 from the optical splitter 121. The first amplifier 122 may output an amplified first light signal ALS1 to the optoelectronic conversion unit 125. The amplified first light signal ALS1 may be a signal obtained by amplifying the first light signal LS1. In detail, the first amplifier 122 may be a module that amplifies light.

In an embodiment, the first amplifier 122 may increase a difference in luminous intensity of the first light signal LS1 received from the optical splitter 121. For example, a difference in luminous intensity of the amplified first light signal ALS1 may be greater than a difference in luminous intensity of the first light signal LS1. As the difference in luminous intensity between a low luminous intensity and a high luminous intensity increases in the amplified first light signal ALS1, it is possible to easily determine the luminous intensity corresponding to the magnitude component of the quadrature amplitude modulation. In detail, the amplified first light signal ALS1 may be a preprocessed light signal suitable for demodulation of the magnitude component. A detailed description related to these will be described later with reference to FIG. 3.

The second amplifier 123 may receive the second light signal LS2 from the optical splitter 121. The second amplifier 123 may output an amplified second light signal ALS2 to the polarization division hybrid 124. The amplified second light signal ALS2 may be a signal obtained by amplifying the second light signal LS2. In detail, the second amplifier 123 may be a module that amplifies light.

In an embodiment, the second amplifier 123 may decrease a difference in luminous intensity of the second light signal LS2 received from the optical splitter 121. For example, the difference in luminous intensity of the amplified second light signal ALS2 may be less than the difference in luminous intensity of the second light signal LS2. As the difference in luminous intensity between a low luminous intensity and a high luminous intensity decreases (i.e., as the luminous intensity is flattened) in the amplified second light signal ALS2, a change in magnitude component that interferes with the demodulation of the phase component of the quadrature amplitude modulation may be controlled. In detail, the amplified second light signal ALS2 may be a preprocessed light signal suitable for demodulation of the phase component. A detailed description related to these will be described later with reference to FIG. 4.

In an embodiment, the difference in luminous intensity of the amplified first light signal ALS1 may be greater than the difference in luminous intensity of the amplified second light signal ALS2. In detail, the amplified first light signal ALS1 may be a light signal suitable for demodulation of the magnitude component than the amplified second light signal ALS2. The amplified second light signal ALS2 may be a light signal suitable for demodulation of the phase component than the amplified first light signal ALS1.

In an embodiment, the second amplifier 123 may include an offset circuit that offsets an effect of an external disturbance on the amplification of the second light signal LS2. For example, the offset circuit may operate to offset the effect of external disturbances such as a change in driving voltage supplied to the second amplifier 123, a current leaking from another adjacent circuit, an internal heat generation of the optical receiver 120, and a change in an external temperature, on the phase of the second light signal LS2.

In an embodiment, each of the first and second amplifiers 122 and 123 may be a gain clamped semiconductor optical amplifier. For example, each of the first and second amplifiers 122 and 123 may have a saturation gain section in which an amplification gain is uniform (or a change in amplification gain is small), despite a change in luminous intensity of an input light signal. A detailed description related to the saturation gain section will be described later with reference to FIG. 4.

In an embodiment, the first amplifier 122 and the second amplifier 123 may be the same amplifier. For example, a difference in characteristics between the amplified first and second light signals ALS1 and ALS2 may be based on a difference in luminous intensity between the first and second light signals LS1 and LS2, not a difference in operating characteristics between the first and second amplifiers 122 and 123.

The polarization division hybrid 124 may receive the amplified second light signal ALS2 from the second amplifier 123. The polarization division hybrid 124 may receive the reference light signal RLS from the reference light signal generator 110. The polarization division hybrid 124 may polarize and separate the amplified second light signal ALS2 and the reference light signal RLS into an in-phase component and a quadrature-phase component, and may generate in-phase and quadrature-phase hybrid light signals HSI and HSQ, based on the polarized and separated light signals, In this case, the in-phase hybrid light signal HSI may be a signal obtained by combining signals of the in-phase component among the polarized and separated light signals. The quadrature-phase hybrid light signal HSQ may be a signal obtained by combining signals of the quadrature-phase component among the polarized and separated light signals. The in-phase and quadrature-phase hybrid light signals HSI and HSQ may be signals used for demodulating the phase component of the light signal LS.

The polarization division hybrid 124 may output the in-phase and quadrature-phase hybrid light signals HSI and HSQ to the optoelectronic conversion unit 125. In detail, the polarization division hybrid 124 may be a module that polarizes, separates, and combines light signals. A detailed description related to these will be described later with reference to FIG. 7.

The optoelectronic conversion unit 125 may receive the amplified first light signal ALS1 from the first amplifier 122. The optoelectronic conversion unit 125 may receive the in-phase and quadrature-phase hybrid light signals HSI and HSQ from the polarization division hybrid 124. The optoelectronic conversion unit 125 may output the electrical signal ES to the signal processor 130. The electrical signal ES may include electrical signals that are obtained by converting the amplified first light signal ALS1, the in-phase hybrid light signal HSI, and the quadrature-phase hybrid light signal HSQ, respectively. The optoelectronic conversion may mean converting light energy of the light signal into electrical energy. In detail, the optoelectronic conversion unit 125 may be a module that converts the light signal.

As described above, according to an embodiment of the present disclosure, an optical receiver that separates and processes a light signal used for demodulation of the magnitude component and a light signal used for demodulation of the phase component may be provided.

Figure 3:
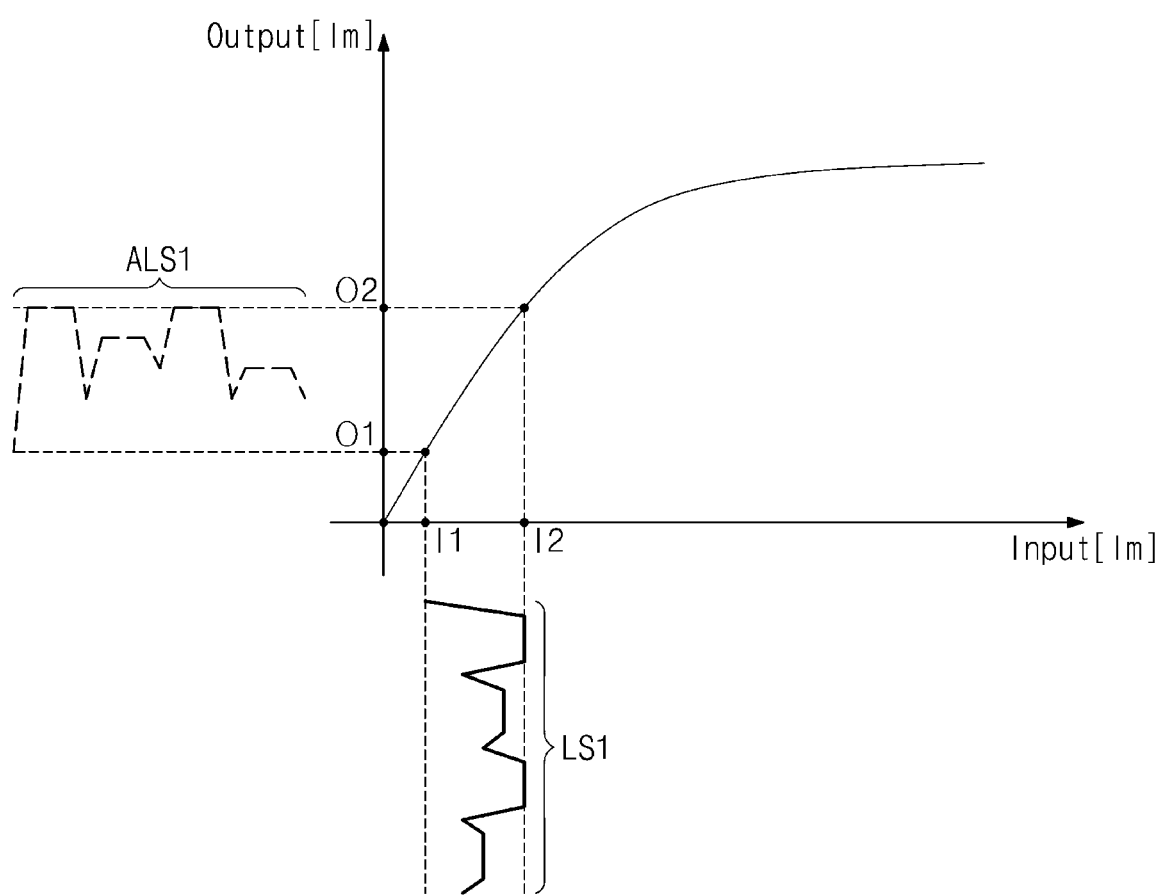
FIG. 3 is a graph illustrating an operation region of a first amplifier of FIG. 2.

FIG. 3 is a graph illustrating an operation region of a first amplifier of FIG. 2. Referring to FIG. 3, a gain curve of the first amplifier 122 of FIG. 2 is illustrated by way of example. A horizontal axis represents the luminous intensity of the light signal input to the first amplifier 122. A vertical axis represents the luminous intensity of the light signal output from the first amplifier 122. For convenience of description, it will be described with reference to FIGS. 2 and 3 together.

In an embodiment, the first amplifier 122 may amplify the light signal in a linear gain section. The linear gain section may be a section in which the first amplifier 122 linearly (or almost linearly) amplifies the received light signal. In more detail, the first amplifier 122 may linearly amplify the first light signal LS1 having the luminous intensity between a first input luminous intensity I1 and a second input luminous intensity I2, and may generate the amplified first light signal ALS1 having the luminous intensity between a first output luminous intensity O1 and a second output luminous intensity O2. In this case, as the luminous intensity of the first light signal LS1 is linearly amplified, a variation in luminous intensity corresponding to the magnitude component of the first light signal LS1 may not be distorted.

In an embodiment, the first amplifier 122 may increase a difference in luminous intensity of the light signal. For example, the difference between the first output luminous intensity O1 and the second output luminous intensity O2 may be greater than the difference between the first input luminous intensity I1 and the second input luminous intensity I2.

As described above, according to an embodiment of the present disclosure, the first amplifier 122 may include the linear gain section in which the luminous intensity of an input light signal is linearly amplified.

Figure 4:
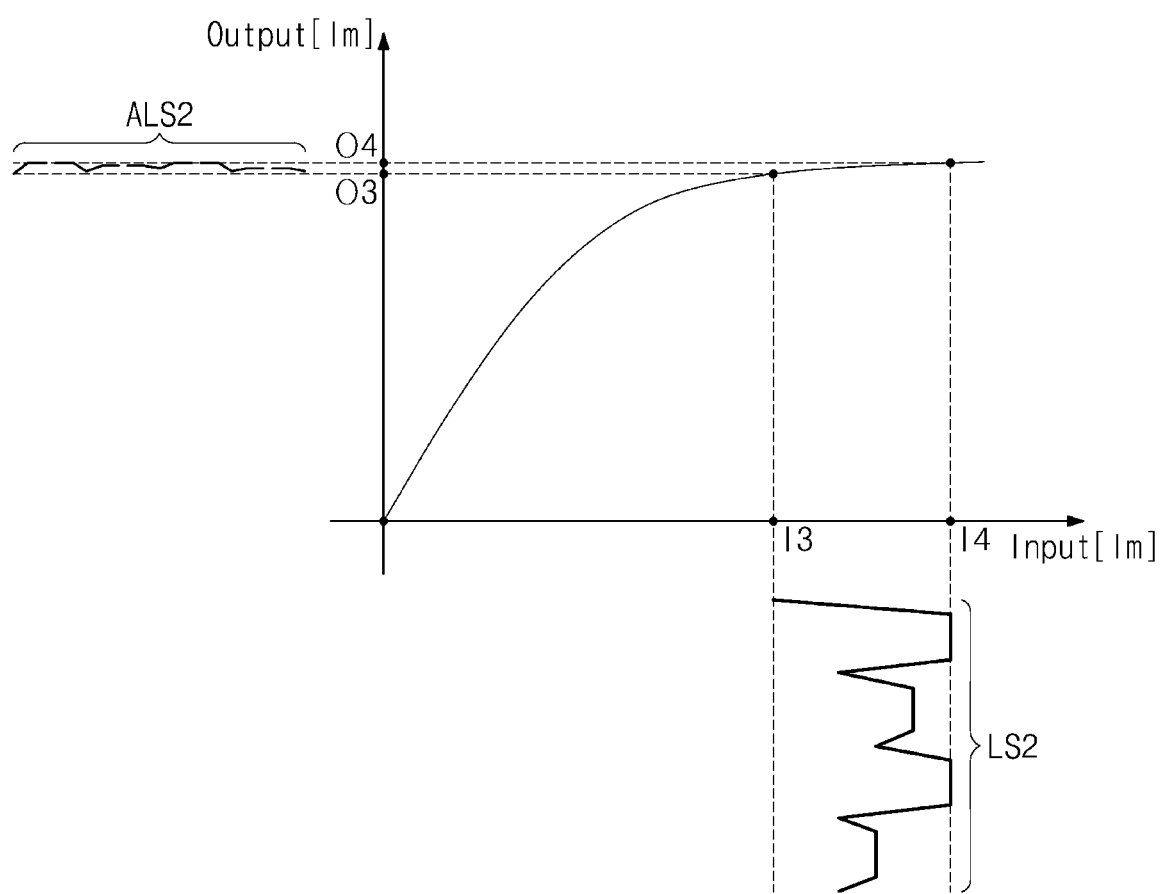
FIG. 4 is a graph illustrating an operation region of a second amplifier of FIG. 2.

FIG. 4 is a graph illustrating an operation region of a second amplifier of FIG. 2. Referring to FIG. 4, a gain curve of the second amplifier 123 of FIG. 2 is illustrated by way of example. A horizontal axis represents the luminous intensity of the light signal input to the second amplifier 123. A vertical axis represents the luminous intensity of the light signal output from the second amplifier 123. For convenience of description, it will be described with reference to FIGS. 2 and 4 together.

In an embodiment, the second amplifier 123 may amplify the light signal in the saturation gain section. The saturation gain section may be a section in which the amplifier amplifies the light signal such that the luminous intensity of the received light signal is flattened. In more detail, the second amplifier 123 may amplify the second light signal LS2 having the luminous intensity between a third input luminous intensity I3 and a fourth input luminous intensity I4 such that the luminous intensity is flattened, and may generate the amplified second light signal ALS2 having the luminous intensity between a third output luminous intensity O3 and a fourth output luminous intensity O4. In this case, as the second light signal LS2 is amplified such that the luminous intensity of the second light signal LS2 is flattened, a change in the magnitude component that interferes with the demodulation of the phase component may be controlled.

In an embodiment, the second amplifier 123 may reduce a difference in luminous intensity of the light signal. For example, the difference in luminous intensity between the third output luminous intensity O3 and the fourth output luminous intensity O4 may be less than the difference in luminous intensity between the third input luminous intensity I3 and the fourth input luminous intensity I4.

As described above, according to an embodiment of the present disclosure, the second amplifier 123 may include the saturation gain section in which the amplifier amplifies the light signal such that the luminous intensity of the input light signal is flattened.

Figure 5:
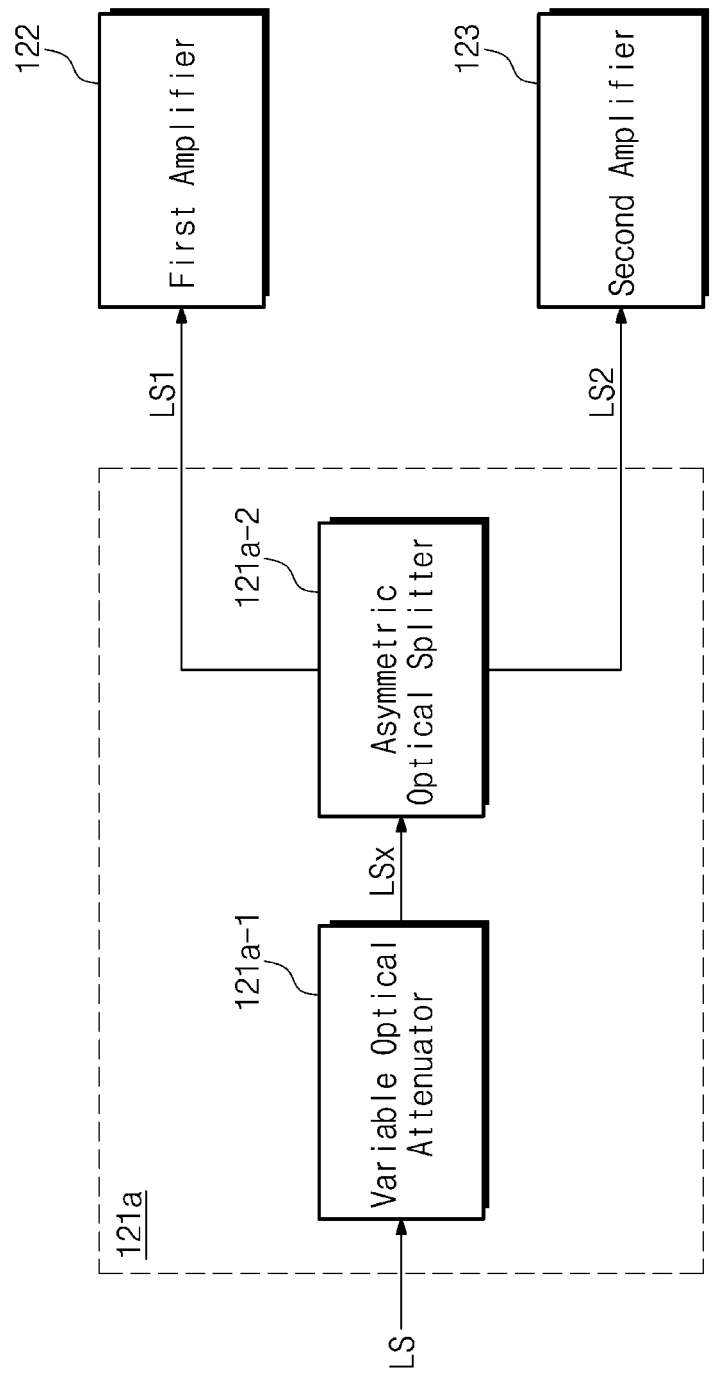
FIG. 5 is a detailed diagram illustrating an optical splitter of FIG. 2.

FIG. 5 is a detailed diagram illustrating an optical splitter of FIG. 2. Referring to FIG. 5, an optical splitter 121a according to a first embodiment is illustrated. The optical splitter 121a may receive the light signal LS. The optical splitter 121a may attenuate the light signal LS and may output the first and second light signals LS1 and LS2 that are asymmetrically split to the first and second amplifiers 122 and 123, respectively.

The optical splitter 121a may include a variable optical attenuator 121a-1 and an asymmetric optical splitter 121a-2. The variable optical attenuator 121a-1 may receive the light signal LS. The variable optical attenuator 121a-1 may output an attenuated light signal LSx to the asymmetric optical splitter 121a-2. The luminous intensity of the attenuated light signal LSx may be less than the luminous intensity of the light signal LS. In detail, the variable optical attenuator 121a-1 may be a module that attenuates the luminous intensity of the light signal LS.

The asymmetric optical splitter 121a-2 may receive the attenuated light signal LSx from the variable optical attenuator 121a-1. The asymmetric optical splitter 121a-2 may output the first and second light signals LS1 and LS2 obtained by asymmetrically splitting the attenuated light signal LSx to the first and second amplifiers 122 and 123, respectively.

In an embodiment, the asymmetric optical splitter 121a-2 may asymmetrically split the attenuated light signal LSx such that the luminous intensity of the second light signal LS2 is greater than the luminous intensity of the first light signal LS1. The luminous intensity of the first light signal LS1 may be included in a luminous intensity range corresponding to the linear gain section of the first amplifier 122. The luminous intensity of the second light signal LS2 may be included in a luminous intensity range corresponding to the saturation gain section of the second amplifier 123.

As described above, according to the first embodiment of the present disclosure, the optical splitter 121a that attenuates the light signal LS and outputs the first and second light signals LS1 and LS2 obtained by asymmetrically splitting the attenuated light signal LSx may be provided.

Figure 6:
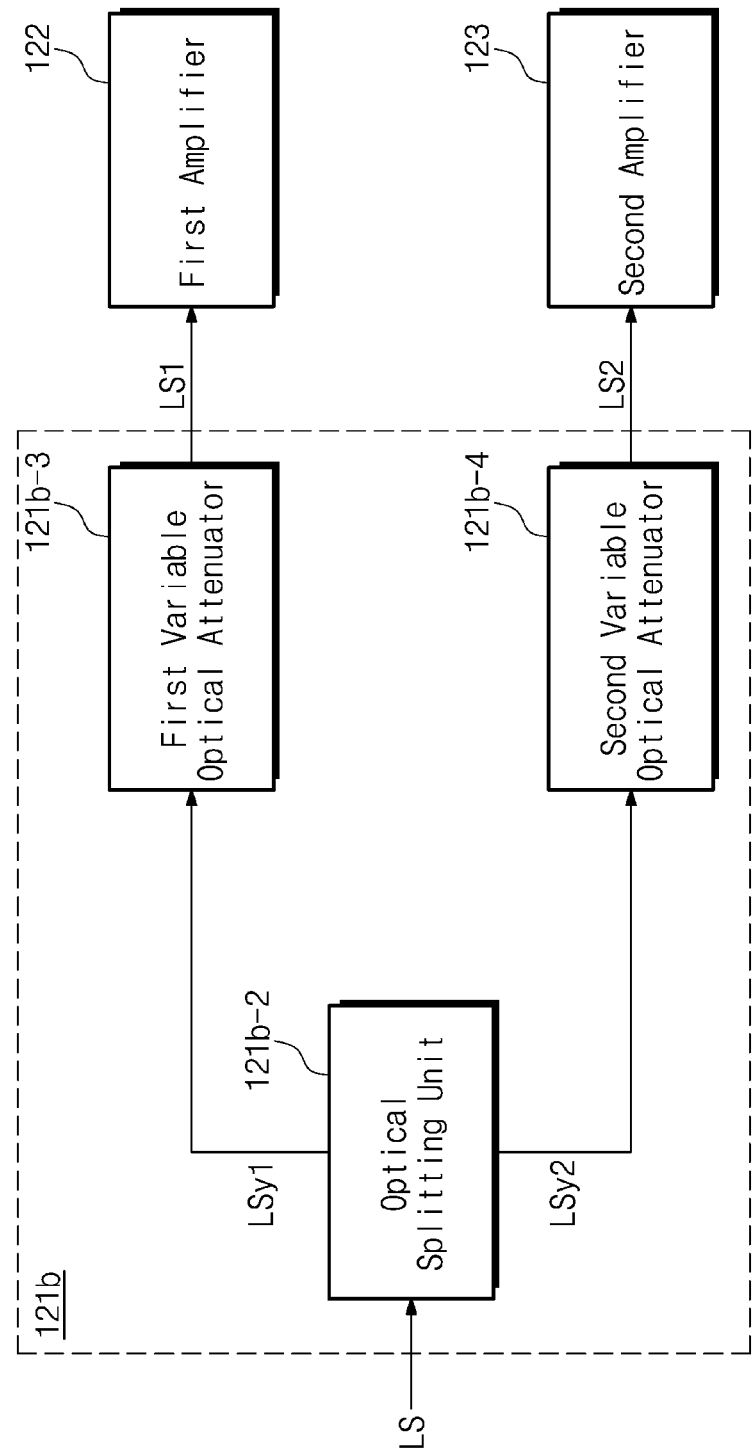
FIG. 6 is a detailed diagram illustrating an optical splitter of FIG. 2.

FIG. 6 is a detailed diagram illustrating an optical splitter of FIG. 2. Referring to FIG. 6, an optical splitter 121b according to a second embodiment is illustrated. The optical splitter 121b may receive the light signal LS. The optical splitter 121b may split the light signal LS and may output the first and second light signals LS1 and LS2 obtained by attenuating the split light signals by different attenuation coefficients to the first and second amplifiers 122 and 123, respectively.

The optical splitter 121b may include an optical splitting unit 121b-2, a first variable optical attenuator 121b-3, and a second variable optical attenuator 121b-4. The optical splitting unit 121b-2 may receive the light signal LS. The optical splitting unit 121b-2 may split the light signal LS into first and second split light signals LSy1 and LSy2. The optical splitting unit 121b-2 may output the first and second split light signals LSy1 and LSy2 to the first and second variable optical attenuators 121b-3 and 121b-4, respectively.

In an embodiment, the optical splitting unit 121b-2 may symmetrically split the light signal LS. For example, the optical splitting unit 121b-2 may symmetrically split the light signal LS to the first and second split light signals LSy1 and LSy2. In this case, the luminous intensity of the first split light signal LSy1 may be the same as that of the second split light signal LSy2.

The first variable optical attenuator 121b-3 may receive the first split light signal LSy1 from the optical splitting unit 121b-2. The first variable optical attenuator 121b-3 may output the first light signal LS1 obtained by attenuating the first split light signal LSy1 by the first attenuation coefficient to the first amplifier 122. In this case, the attenuation coefficient of the optical attenuator may represent a degree of attenuating the luminous intensity of the light signal. For example, as the attenuation coefficient of the optical attenuator increases, the luminous intensity of the light signal output from the optical attenuator may be decreased.

The second variable optical attenuator 121b-4 may receive the second split light signal LSy2 from the optical splitting unit 121b-2. The second variable optical attenuator 121b-4 may output the second light signal LS2 obtained by attenuating the second split light signal LSy2 by a second attenuation coefficient to the second amplifier 123.

In an embodiment, the second attenuation coefficient of the second variable optical attenuator 121b-4 may be less than the first attenuation coefficient of the first variable optical attenuator 121b-3. For example, when the first and second split light signals LSy1 and LSy2 have the same luminous intensity, the first variable optical attenuator 121b-3 may output first light signal LS1 obtained by attenuating the first split light signal LSy1 by the first attenuation coefficient. The second variable optical attenuator 121b-4 may output the second light signal LS2 obtained by attenuating the second split light signal LSy2 by the second attenuation coefficient.

In this case, the luminous intensity of the first light signal LS1 may be less than the luminous intensity of the second light signal LS2. In addition, the luminous intensity of the first light signal LS1 may be included in a luminous intensity range corresponding to the linear gain section of the first amplifier 122. The luminous intensity of the second light signal LS2 may be included in a luminous intensity range corresponding to the saturation gain section of the second amplifier 123.

As described above, according to the second embodiment of the present disclosure, the optical splitter 121b that splits the light signal LS and outputs the first and second light signals LS1 and LS2 obtained by attenuating the first and second split light signals LSy1 and LSy2 by the first and second attenuation coefficients, respectively may be provided.

Figure 7:
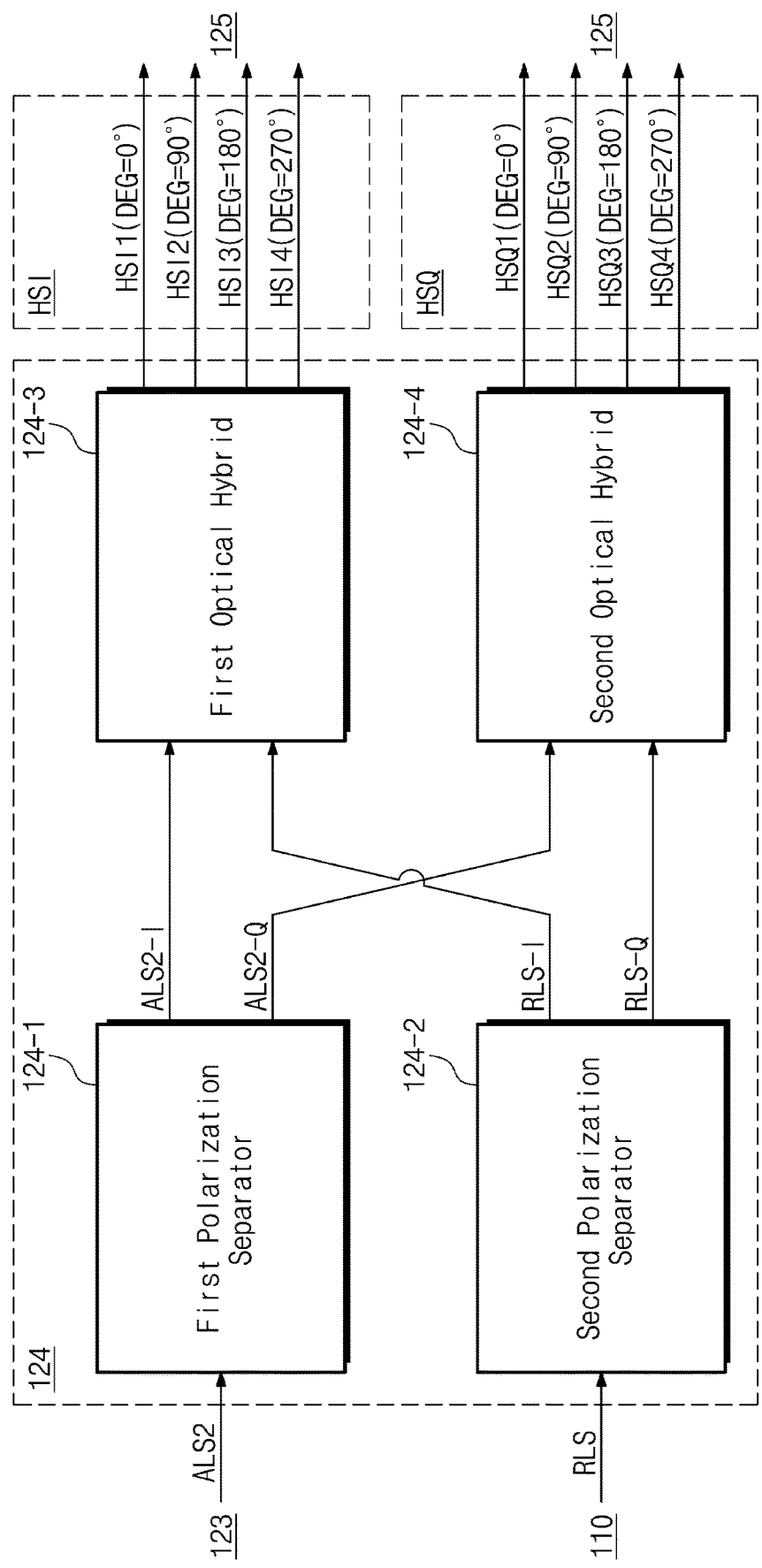
FIG. 7 is a detailed diagram illustrating a polarization division hybrid of FIG. 2.

FIG. 7 is a detailed diagram illustrating a polarization division hybrid of FIG. 2. Referring to FIG. 7, the polarization division hybrid 124 is illustrated as an example. The polarization division hybrid 124 may polarize and separate the amplified second light signal ALS2 and the reference light signal RLS into the in-phase component and the quadrature-phase component, respectively, and may generate the in-phase and quadrature-phase hybrid light signals HSI and HSQ, based on the polarized and separated light signals, The polarization division hybrid 124 may include a first polarization separator 124-1, a second polarization separator 124-2, a first optical hybrid 124-3, and a second optical hybrid 124-4.

The first polarization separator 124-1 may receive the amplified second light signal ALS2 from the second amplifier 123. The first polarization separator 124-1 may polarize and separate the amplified second light signal ALS2 into the in-phase component and the quadrature-phase component, and may output an in-phase signal ALS2-I including the polarized and separated in-phase component and a quadrature-phase signal ALS2-Q including the polarized and separated quadrature-phase component to the first and second optical hybrids 124-3 and 124-4, respectively. In detail, the first polarization separator 124-1 may be a module that polarizes and separates the light signal.

The second polarization separator 124-2 may receive the reference light signal RLS from the reference light signal generator 110. The second polarization separator 124-2 may polarize and separate the reference light signal RLS into the in-phase component and the quadrature-phase component, and may output an in-phase signal RLS-I including the polarized and separated in-phase component and a quadrature-phase signal RLS-Q including the polarized and separated quadrature-phase component to the first and second optical hybrids 124-3 and 124-4, respectively. The second polarization separator 124-2 may have a similar structure to the first polarization separator 124-1.

The first optical hybrid 124-3 may receive the in-phase signal ALS2-I from the first polarization separator 124-1. The first optical hybrid 124-3 may receive the in-phase signal RLS-I from the second polarization separator 124-2. The first optical hybrid 124-3 may output the in-phase hybrid light signal HSI to the optoelectronic conversion unit 125, based on the in-phase signals ALS2-I and RLS-I. In detail, the first optical hybrid 124-3 may be a module that combines light signals.

In an embodiment, the first optical hybrid 124-3 may combine the in-phase signals ALS2-I and RLS-I under different phase conditions to generate first to fourth in-phase hybrid light signals HSI1 to HSI4.

In more detail, the first optical hybrid 124-3 may split the in-phase signal ALS2-I into four signals, and may shift phases of the four split in-phase signals ALS2-I to 0 degrees, 90 degrees, 180 degrees, and 270 degrees, respectively. The first optical hybrid 124-3 may split the in-phase signal RLS-I into four signals. The first optical hybrid 124-3 may combine the four in-phase signals ALS2-I that are shifted by 0 degrees, 90 degrees, 180 degrees, and 270 degrees, respectively with the four split in-phase signals RLS-I to generate the first to fourth in-phase hybrid light signals HSI1 to HSI4.

In detail, when a change in luminous intensity due to split is ignored, the first in-phase hybrid light signal HSI1 may be a combination of the in-phase signal ALS2-I and the in-phase signal RLS-I. The second in-phase hybrid light signal HSI2 may be a combination of the in-phase signal ALS2-I that is phase-shifted by 90 degrees and the in-phase signal RLS-I. The third in-phase hybrid light signal HSI3 may be a combination of the in-phase signal ALS2-I that is phase-shifted by 180 degrees and the in-phase signal RLS-I. The fourth in-phase hybrid light signal HSI4 may be a combination of the in-phase signal ALS2-I that is phase-shifted by 270 degrees and the in-phase signal RLS-I. In this case, the first to fourth in-phase hybrid light signals HSI1 to HSI4 may be included in the in-phase hybrid light signal HSI.

The second optical hybrid 124-4 may receive the quadrature-phase signal ALS2-Q from the first polarization separator 124-1. The second optical hybrid 124-4 may receive the quadrature-phase signal RLS-Q from the second polarization separator 124-2. The second optical hybrid 124-4 may output the quadrature-phase hybrid light signal HSQ to the optoelectronic conversion unit 125, based on the quadrature-phase signals ALS2-Q and RLS-Q. The second optical hybrid 124-4 may have a structure similar to that of the first optical hybrid 124-3.

In an embodiment, the second optical hybrid 124-4 may combine the quadrature-phase signals ALS2-Q and RLS-Q under different phase conditions to generate first to fourth quadrature-phase hybrid light signals HSQ1 to HSQ4. The first to fourth quadrature-phase hybrid light signals HSQ1 to HSQ4 may be included in the quadrature-phase hybrid light signal HSQ. Since the process of generating the first to fourth quadrature-phase hybrid light signals HSQ1 to HSQ4 is similar to the process of generating the first to fourth in-phase hybrid light signals HSI1 to HSI4 described above, a detailed description thereof will be omitted to avoid redundancy.

Figure 8:
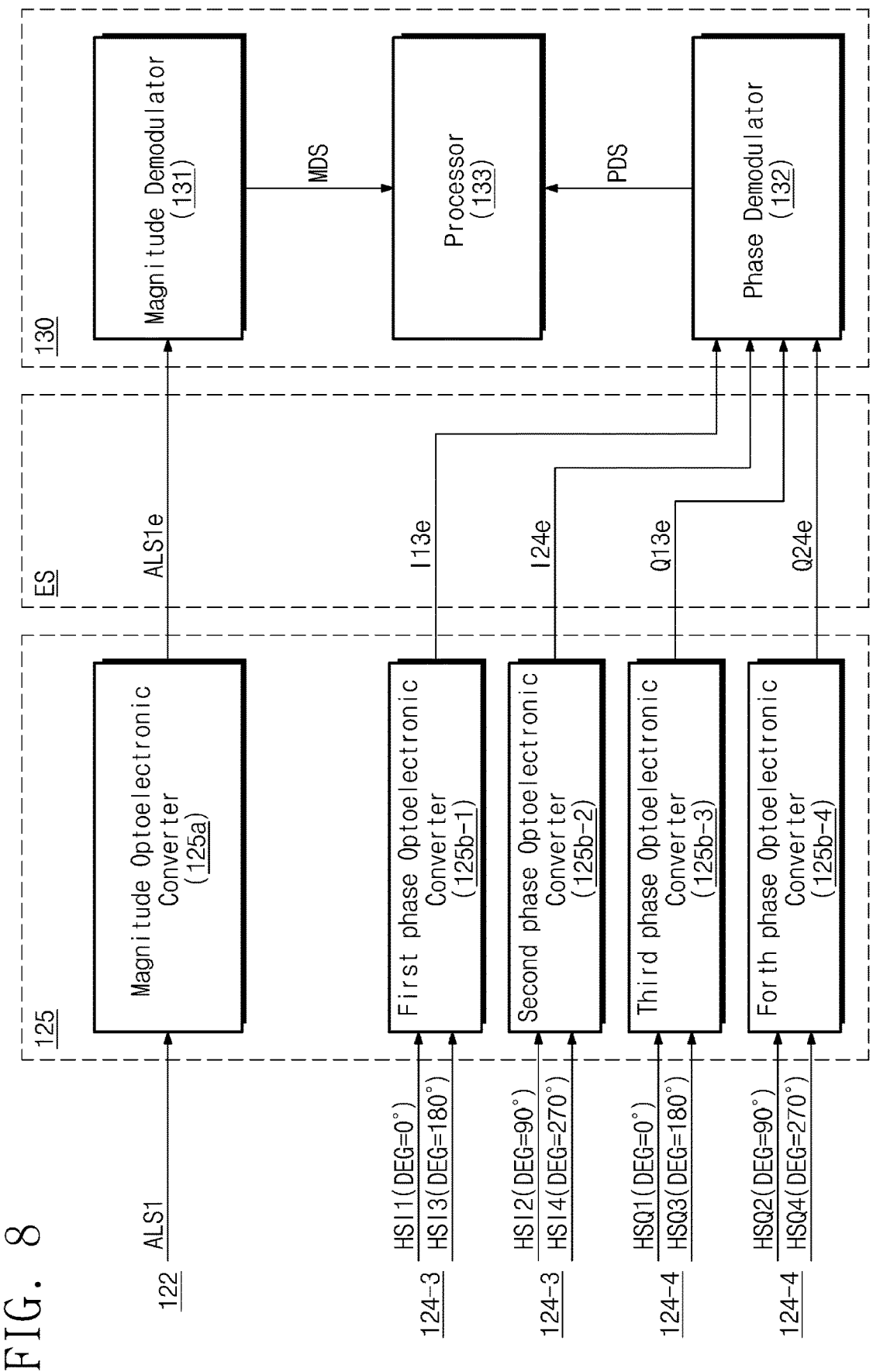
FIG. 8 is a detailed diagram illustrating an optoelectronic conversion unit of FIG. 2.

FIG. 8 is a detailed diagram illustrating an optoelectronic conversion unit of FIG. 2. Referring to FIG. 8, the optoelectronic conversion unit 125 is illustrated as an example. The optoelectronic conversion unit 125 may receive the amplified first light signal ALS1 from the first amplifier 122. The optoelectronic conversion unit 125 may receive the in-phase hybrid light signals HSI1 to HSI4 from the first optical hybrid 124-3 and the quadrature-phase hybrid light signals HSQ1 to HSQ4 from the second optical hybrid 124-4. The optoelectronic conversion unit 125 may output the electrical signal ES obtained by converting the received signals ALS1, HSI1 to HSI4, and HSQ1 to HSQ4 to the signal processor 130. The electrical signal ES may include electrical signals ALS1e, I13e, I24e, Q13e, and Q24e.

The optoelectronic conversion unit 125 may include a magnitude optoelectronic converter 125a and first to fourth phase optoelectronic converters 125b-1 to 125b-4. To more clearly describe the characteristics of the optoelectronic conversion unit 125, the signal processor 130 is also described together. The signal processor 130 may include a magnitude demodulator 131, a phase demodulator 132, and a processor 133.

The magnitude optoelectronic converter 125a may receive the amplified first light signal ALS1 from the first amplifier 122. The magnitude optoelectronic converter 125a may generate the electrical signal ALS1e obtained by converting the amplified first light signal ALS1. The magnitude optoelectronic converter 125a may output the electrical signal ALS1e to the magnitude demodulator 131.

The first phase optoelectronic converter 125b-1 may receive the first and third in-phase hybrid light signals HSI1 and HSI3 from the first optical hybrid 124-3. In this case, a phase difference between the first and third in-phase hybrid light signals HSI1 and HSI3 may be 180 degrees. The first phase optoelectronic converter 125b-1 may generate the electrical signal I13e, based on the difference between the first and third in-phase hybrid light signals HSI1 and HSI3. The first phase optoelectronic converter 125b-1 may output the electrical signal I13e to the phase demodulator 132.

The second phase optoelectronic converter 125b-2 may receive the second and fourth in-phase hybrid light signals HSI2 and HSI4 from the first optical hybrid 124-3. In this case, a phase difference between the second and fourth in-phase hybrid light signals HSI2 and HSI4 may be 180 degrees. The second phase optoelectronic converter 125b-2 may generate the electrical signal I24e, based on the difference between the second and fourth in-phase hybrid light signals HSI2 and HSI4. The second phase optoelectronic converter 125b-2 may output the electrical signal I24e to the phase demodulator 132.

The third phase optoelectronic converter 125b-3 may receive the first and third quadrature-phase hybrid light signals HSQ1 and HSQ3 from the second optical hybrid 124-4. In this case, a phase difference between the first and third quadrature-phase hybrid light signals HSQ1 and HSQ3 may be 180 degrees. The third phase optoelectronic converter 125b-3 may generate the electrical signal Q13e, based on the difference between the first and third quadrature-phase hybrid light signals HSQ1 and HSQ3. The third phase optoelectronic converter 125b-3 may output the electrical signal Q13e to the phase demodulator 132.

The fourth phase optoelectronic converter 125b-4 may receive the second and fourth quadrature-phase hybrid light signals HSQ2 and HSQ4 from the second optical hybrid 124-4. In this case, a phase difference between the second and fourth quadrature-phase hybrid light signals HSQ2 and HSQ4 may be 180 degrees. The fourth phase optoelectronic converter 125b-4 may generate the electrical signal Q24e, based on the difference between the second and fourth quadrature-phase hybrid light signals HSQ2 and HSQ4. The fourth phase optoelectronic converter 125b-4 may output the electrical signal Q24e to the phase demodulator 132.

The magnitude demodulator 131 may receive the electrical signal ALS1e from the magnitude optoelectronic converter 125a. In this case, the electrical signal ALS1e may be a signal obtained by converting the amplified first light signal ALS1. The magnitude demodulator 131 may demodulate the magnitude component, based on the electrical signal ALS1e. The magnitude demodulator 131 may output a magnitude demodulation signal MDS including information corresponding to the demodulated magnitude component to the processor 133.

The phase demodulator 132 may receive the electrical signals I13e, I24e, Q13e, and Q24e from the first to fourth phase optoelectronic converters 125b-1 to 125b-4. In this case, the electrical signals I13e and I24e may be signals obtained by converting the in-phase hybrid light signals HSI1 to HSI4. The electrical signals Q13e and Q24e may be signals obtained by converting the quadrature-phase hybrid light signals HSQ1 to HSQ4. The phase demodulator 132 may demodulate the phase component, based on the electrical signals I13e, I24e, Q13e, and Q24e. The phase demodulator 132 may output a phase demodulation signal PDS including information corresponding to the demodulated phase component to the processor 133.

The processor 133 may receive the magnitude demodulation signal MDS from the magnitude demodulator 131. The processor 133 may receive the phase demodulation signal PDS from the phase demodulator 132. The processor 133 may demodulate the quadrature amplitude modulation, based on the magnitude demodulation signal MDS and the phase demodulation signal PDS. In detail, the processor 133 may restore data included in the modulated light signal based on quadrature amplitude modulation.

FIG. 9 is a flowchart describing an operation method of an optical receiver according to an embodiment of the present disclosure. Referring to FIG. 9, a method of operating an optical receiver is described by way of example. In operation S110, the optical receiver may receive the light signal and the reference light signal. The light signal may be a modulated signal based on the quadrature amplitude modulation. The light signal may be a signal received from the outside (e.g., an optical transmitter). The reference light signal may be a signal of providing a reference phase in demodulation of the phase component. The reference light signal may be a signal received from a separate module (e.g., a reference light signal generator).

In operation S120, the optical receiver may generate the first and second light signals, based on the light signal received in operation S110. The first light signal may be a signal used for demodulation of the magnitude component. The second light signal may be a signal used for demodulation of the phase component.

In an embodiment, the optical receiver may generate the first and second light signals by attenuating the light signal received in operation S110. For example, the luminous intensity of the first light signal and the luminous intensity of the second light signal may be less than that of the light signal received in operation S110.

In an embodiment, the optical receiver may asymmetrically generate the first and second light signals. For example, the optical receiver may generate the second light signal having a greater luminous intensity than the first light signal. The first light signal is a signal included in the linear gain section of the amplifier and may be a signal suitable for demodulation of the magnitude component. The second light signal is a signal included in the saturation gain section of the amplifier, and may be a signal suitable for demodulation of the phase component.

In an embodiment, the optical receiver may attenuate the light signal, and then may split the attenuated light signals into the first and second light signals. For example, the optical receiver may attenuate the light signal received in operation S110. Thereafter, the optical receiver may asymmetrically split the attenuated light signal into the first and second light signals. In this case, the luminous intensity of the second light signal may be greater than that of the first light signal.

In an embodiment, the optical receiver may split the light signal, and then may generate the first and second light signals by attenuating the split light signals. For example, the optical receiver may split the light signal received in operation S110 into the first and second split light signals. In this case, the luminous intensity of the first split light signal may be the same as that of the second split light signal.

Thereafter, the optical receiver may generate the first light signal obtained by attenuating the first split light signal by the first attenuation coefficient. The optical receiver may generate the second light signal obtained by attenuating the second split light signal by the second attenuation coefficient less than the first attenuation coefficient. In this case, the process of attenuating the first split light signal and the process of attenuating the second split light signal may be performed in parallel, or the process of attenuating the first split light signal may be performed earlier than the process of attenuating the second split light signal.

Alternatively, the process of attenuating the first split light signal may be performed later than the process of attenuating the second split light signal.

In operation S130, the optical receiver may amplify the first and second light signals generated in operation S120. In an embodiment, the optical receiver may amplify the first light signal in the linear gain section and may amplify the second light signal in the saturation gain section.

In an embodiment, in operation S130, the optical receiver may amplify the first light signal such that a difference in luminous intensity of the first light signal increases. Also, the optical receiver may amplify the second light signal such that a difference in luminous intensity of the second light signal decreases. In detail, the optical receiver may preprocess the first light signal suitable for demodulation of the magnitude component, and may preprocess the second light signal suitable for demodulation of the phase component.

In operation S140, the optical receiver may polarize and separate the reference light signal in operation S110 and the amplified second light signal in operation S130, and may generate the in-phase hybrid light signal and the quadrature-phase hybrid light signal, based on the polarized and separated light signals. The in-phase hybrid light signal may include a signal in which signals of in-phase component are combined among the polarized and separated light signals. The quadrature-phase hybrid light signal may include a signal in which signals of quadrature-phase component are combined among the polarized and separated light signals.

In operation S150, the optical receiver may process the amplified first light signal in operation S130, the in-phase hybrid light signal in operation S140, and the quadrature-phase hybrid light signal in operation S140.

In an embodiment, the optical receiver may convert the amplified first light signal into the electrical signal, and then may output the converted signal to the magnitude demodulator. In this case, the magnitude demodulator may be a module that demodulates the magnitude component in the quadrature amplitude modulation.

In an embodiment, the optical receiver may convert the in-phase and quadrature-phase hybrid light signals, respectively, and then may output the converted signals to the phase demodulator. In this case, the phase demodulator may be a module that demodulates the phase component in the quadrature amplitude modulation.

As described above, according to an embodiment of the present disclosure, an operation method of the optical receiver may be provided that separates and processes the first light signal used for demodulation of the magnitude component and the second light signal used for demodulation of the phase component in the quadrature amplitude modulation.

According to an embodiment of the present disclosure, an optical receiver in which a magnitude modulation and a phase modulation are separated in the quadrature amplitude modulation, and an operation method thereof are provided.

In addition, through preprocessing of optically separating a magnitude modulation and a phase modulation, an optical receiver in which a reception sensitivity of the magnitude modulation is improved and a change in luminous intensity in the phase modulation is suppressed, and an operation method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An optical receiver comprising:
  an optical splitter configured to split an external light signal to output a first light signal and a second light signal;
  a first amplifier configured to amplify the first light signal in a linear gain section to output an amplified first light signal;
  a second amplifier configured to amplify the second light signal in a saturation gain section to output an amplified second light signal;

a polarization division hybrid configured to output an in-phase hybrid light signal and a quadrature-phase hybrid light signal, based on a reference light signal and the amplified second light signal; and an optoelectronic conversion unit configured to output an electrical signal, based on the amplified first light signal, the in-phase hybrid light signal, and the quadrature-phase hybrid light signal.

2. The optical receiver of claim 1, wherein a luminous intensity of the second light signal is greater than that of the first light signal.

3. The optical receiver of claim 1, wherein the optical splitter includes:
an optical attenuator configured to attenuate a luminous intensity of the external light signal; and
an asymmetric optical splitter configured to receive the attenuated external light signal from the optical attenuator, to asymmetrically split the attenuated external light signal into the first light signal and the second light signal, and to output the first light signal and the second light signal to the first amplifier and the second amplifier, respectively.

4. The optical receiver of claim 1, wherein the optical splitter includes:
an optical splitting unit configured to split the external light signal into a first split light signal and a second split light signal that have the same luminous intensity;
a first optical attenuator configured to output the first light signal obtained by attenuating the first split light signal by a first attenuation coefficient to the first amplifier; and
a second optical attenuator configured to output the second light signal obtained by attenuating the second split light signal by a second attenuation coefficient less than the first attenuation coefficient to the second amplifier.

5. The optical receiver of claim 1, wherein the first amplifier is further configured to increase a difference in luminous intensity of the first light signal received from the optical splitter.

6. The optical receiver of claim 1, wherein the second amplifier is further configured to decrease a difference in luminous intensity of the second light signal received from the optical splitter.

7. The optical receiver of claim 1, wherein a difference in luminous intensity of the amplified first light signal is greater than that of the amplified second light signal.

8. The optical receiver of claim 1, wherein each of the first and second amplifiers is a gain clamped semiconductor optical amplifier.

9. The optical receiver of claim 1, wherein the second amplifier includes an offset circuit that offsets an effect of an external disturbance on an amplification of the second light signal.

10. The optical receiver of claim 1, wherein the optoelectronic conversion unit is further configured to convert the amplified first light signal to output a first electrical signal for demodulating a magnitude component of the external light signal, and to convert the in-phase hybrid light signal and the quadrature-phase hybrid light signal to output at least one of a second electrical signal for demodulating a phase component of the external light signal, and
wherein the electrical signal includes the first electrical signal and the at least one of the second electrical signal.

11. An optical receiver comprising:
an optical splitter configured to split an external light signal to output a first light signal and a second light signal having a greater luminous intensity than that of the first light signal;
a first amplifier configured to output an amplified first light signal, based on the first light signal;
a second amplifier configured to output an amplified second light signal, based on the second light signal;
a polarization division hybrid configured to output an in-phase hybrid light signal and a quadrature-phase hybrid light signal, based on a reference light signal and the amplified second light signal; and
an optoelectronic conversion unit configured to output an electrical signal, based on the amplified first light signal, the in-phase hybrid light signal, and the quadrature-phase hybrid light signal.

12. The optical receiver of claim 11, wherein the first amplifier and the second amplifier have a linear gain section corresponding to a luminous intensity range of the first light signal and a saturation gain section corresponding to a luminous intensity range of the second light signal, respectively.

13. The optical receiver of claim 11, wherein the optical splitter includes:
an optical attenuator configured to attenuate a luminous intensity of the external light signal; and
an asymmetric optical splitter configured to receive the attenuated external light signal from the optical attenuator, to asymmetrically split the attenuated external light signal into the first light signal and the second light signal, and to output the first light signal and the second light signal to the first amplifier and the second amplifier, respectively.

14. The optical receiver of claim 11, wherein the optical splitter includes:
an optical splitting unit configured to split the external light signal into a first split light signal and a second split light signal that have the same luminous intensity;
a first optical attenuator configured to output the first light signal obtained by attenuating the first split light signal by a first attenuation coefficient to the first amplifier; and
a second optical attenuator configured to output the second light signal obtained by attenuating the second split light signal by a second attenuation coefficient less than the first attenuation coefficient to the second amplifier.

15. A method of operating an optical receiver, the method comprising:
receiving an external light signal and a reference light signal;
generating a first light signal and a second light signal, based on the external light signal;
amplifying the first light signal in a linear gain section and amplifying the second light signal in a saturation gain section;
generating an in-phase hybrid light signal and a quadrature-phase hybrid light signal, based on the reference light signal and the amplified second light signal; and
processing the amplified first light signal, the in-phase hybrid light signal, and the quadrature-phase hybrid light signal.

16. The method of claim 15, the generating of the first light signal and the second light signal includes:
attenuating a luminous intensity of the external light signal; and asymmetrically splitting the attenuated external light signal into the first light signal and the second light signal having a greater luminous intensity than that of the first light signal.

17. The method of claim 15, wherein the generating of the first light signal and the second light signal includes:
   splitting the external light signal into a first split light signal and a second split light signal that have the same luminous intensity;
   generating the first light signal obtained by attenuating the first split light signal by a first attenuation coefficient; and
   generating the second light signal obtained by attenuating the second split light signal by a second attenuation coefficient less than the first attenuation coefficient.

18. The method of claim 15, wherein the amplifying of the first light signal in the linear gain section and the amplifying of the second light signal in the saturation gain section includes:
   amplifying the first light signal to increase a difference in luminous intensity of the first light signal; and
   amplifying the second light signal to decrease a difference in luminous intensity of the second light signal.

\* \* \* \* \*